(12) United States Patent
Kosmicki et al.

(10) Patent No.: US 11,477,929 B2
(45) Date of Patent: Oct. 25, 2022

(54) IMPLEMENT HITCH SYSTEM FOR VERTICAL LOAD TRANSFER

(71) Applicant: Deere & Company, Moline, IL (US)

(72) Inventors: Peter A. Kosmicki, Cedar Falls, IA (US); Benjamin J. Heimbuch, Cedar Falls, IA (US)

(73) Assignee: Deere & Company, Moline, IL (US)

(*) Notice: Subject to any disclaimer, the term of this patent is extended or adjusted under 35 U.S.C. 154(b) by 275 days.

(21) Appl. No.: 16/736,038

(22) Filed: Jan. 7, 2020

(65) Prior Publication Data
US 2021/0204464 A1 Jul. 8, 2021

(51) Int. Cl.
*A01B 59/042* (2006.01)
*A01B 63/14* (2006.01)
*B60G 17/0195* (2006.01)

(52) U.S. Cl.
CPC .......... *A01B 59/042* (2013.01); *A01B 63/145* (2013.01); *B60G 17/0195* (2013.01); *B60G 2300/082* (2013.01); *B60G 2400/60* (2013.01)

(58) Field of Classification Search
CPC ............... B60G 17/015; B60G 17/016; B60G 17/0195; B60G 2300/082; B60G 2400/60; A01B 59/00; A01B 59/002; A01B 59/04; A01B 59/042; A01B 59/062; A01B 63/11; A01B 63/1145; A01B 63/14; A01B 63/145
See application file for complete search history.

(56) References Cited

U.S. PATENT DOCUMENTS

| 7,458,428 B2 | 12/2008 | Laudick et al. |
| 9,228,322 B2 | 1/2016 | Keys, II et al. |
| 2015/0053435 A1 | 2/2015 | Romig et al. |
| 2016/0039480 A1* | 2/2016 | Pichlmaier ........... A01B 63/145 701/29.1 |
| 2018/0213712 A1* | 8/2018 | Kline ..................... A01B 49/02 |
| 2018/0310458 A1 | 11/2018 | Garcia |

FOREIGN PATENT DOCUMENTS

| DE | 102017120869 A1 * | 3/2019 | ........... A01B 59/042 |
| EP | 3245857 A1 * | 11/2017 | ............. A01D 80/00 |
| WO | WO-2019079901 A * | 5/2019 | ........... A01B 59/042 |

* cited by examiner

*Primary Examiner* — Tara Mayo-Pinnock
(74) *Attorney, Agent, or Firm* — Tucker Ellis LLP; Michael G. Craig; Heather M. Barnes

(57) ABSTRACT

One or more techniques and/or systems are disclosed for proving operation of a vehicle towing an implement. A hitch assembly can be used to adjust or distribute a vertical downward force that an attached implement applies to the frame of a vehicle towing the implement. A sensor assembly can identify the torque that is being applied to the front and rear axles. The torque data can be used to generate adjustments to the vertical load actuator, which can to adjust an amount of load applied to the front and/or rear axles. In this way, vertical load may be efficiently distributed between the front and rear axles automatically.

20 Claims, 13 Drawing Sheets

IMPLEMENT HITCH SYSTEM FOR VERTICAL LOAD TRANSFER

BACKGROUND

Towed and/or drawbar attached implements, such as those that are attached to an agricultural vehicle or construction vehicle, can impart vertical and draft loads on the vehicle towing the implement. Some implements, such as scrapers, graders, planters, seeders, tillage equipment, carts and the like can impart large vertical loads on the rear axle of the towing vehicle. Typical implement attachments between the vehicle and the implement decrease the load on the front axle, which can decrease tractive efficiency of the front axle, and may result in an increased load to the rear axle. Further, current implement attachment systems do not have the ability to transfer the vertical load from the rear to the front of the vehicle based on site conditions.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

One or more techniques and systems are described herein for an implement hitch system for adjusting or distributing the vertical downward force, applied by an attached implement to a vehicle, based on in-situ conditions. A sensor assembly can identify data from a vehicle towing an implement, such as vertical load applied to the vehicle's axles, traction slippage of tire or tracks, draft load, implement ground depth, and actuator positions. One or more portions of this data can be used to adjust one or more actuators to adjust an amount of load applied to different parts of the vehicle. This adjustment can be done in real time to automatically or manually adjust the load.

In one implementation of a system for improving operation of a vehicle towing an implement, a hitch assembly can comprise a vertical load member, and a vertical load actuator. The vertical load member can comprise a front end and a rear end, where the front end is pivotably coupled with a frame of a vehicle at a point forward of an axis of rotation of a rear axle of the vehicle, and the rear end is operably coupled with an implement hitch engaged with an implement. The vertical load actuator is coupled with the vehicle frame and with the vertical load member between the front end and the rear end to operably raise and lower the rear end of the vehicle load member. Further, the system can comprise a sensor assembly that identifies torque at a front axle and at the rear axle of the vehicle that is operably towing the implement. Additionally, the system can comprise a control unit that comprises a processor. The control unit is communicatively coupled with the sensor assembly to receive data indicative of the torque at the front axle and at the rear axle from the sensor assembly. The control unit generates vertical load adjustment data to adjust the vertical load actuator based at least upon the data received from the sensor array.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

DETAILED DESCRIPTION

Figure 1:
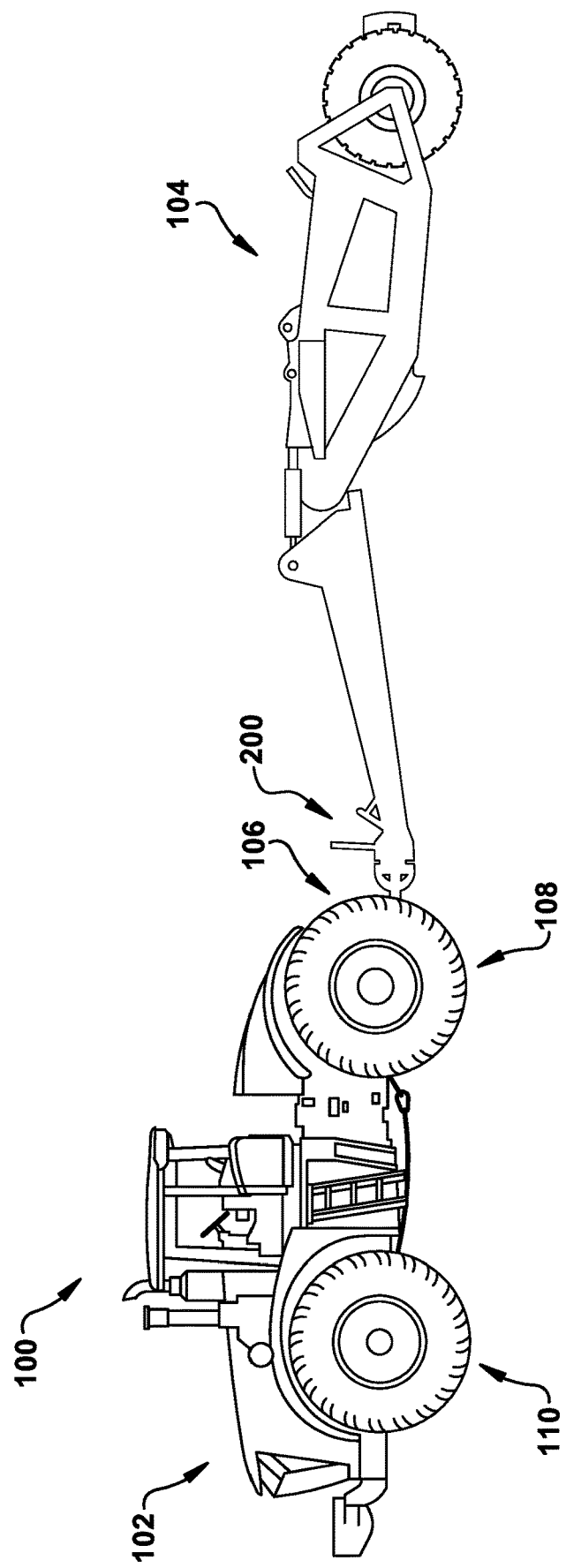
FIG. 1 is a component diagram illustrating an example implementation of a vehicle and implement towing system.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

FIG. 1 is a component diagrams illustrating an example implementation of a system that may utilize one or more portions of the innovative concepts described herein. In this implementation, as illustrated in FIG. 1, a vehicle 102, such as a tractor, can be coupled with a ground working implement 104, such as a scraper. In this implementation, for example, the implement 104 can be towed behind the vehicle 102 during a ground working operation in a field. In some implementation, as illustrated, the vehicle 102 may have wheels installed. In other implementations the vehicle 102 may have track systems installed on the rear or both the front and rear instead of wheels. Further, the implement 104 can be coupled to the vehicle at a coupling 106, such as using a hitch coupled with a drawbar or implement tongue.

As one example, the vehicle 102, such as a tractor, can be attached to the implement 104, such as one or more scrapers, to perform ground scraping operations to level the ground by moving dirt from one place to another. In this example, the tractor can tow the scraper(s) over the ground, and the height of the scraper, with respect to the ground, can be adjusted to adjust how much dirt is being collected. As the scraper height is lowered a greater amount of dirt is removed, and more dirt is collected in the scraper, for example. This can result in a greater downward vertical force applied at the coupling 106 between the tractor and scraper. In this example, the downward force at the coupling 106 can result in a greater downward vertical force applied to a rear axle 108 of the tractor. In some implementations, the greater downward force at the rear axle 108 can result in an upward vertical force at a front axle 110 of the tractor. As an example, the upward force to the front axle 110 may result in a loss of traction between the tractor tires and the ground, as less tire surface area is in contact with the ground, and less pressure is applied to the ground.

While this example describes a tractor coupling with one or more scrapers, it should be appreciated that the systems and methods described herein may also be utilized with other types of vehicles and implements. For example, the vehicle may comprise another utility-type vehicle, such as a truck, hauler, semi-tractor, or any vehicle that tows an implement that may apply a downward vertical force on the coupling point. Further, for example, the implement may comprise a planter, seeder, tillage implement, grain carts, graders, and other implements that can apply a varying amount of vertical downward force on the coupling with the towing vehicle.

Figure 2:
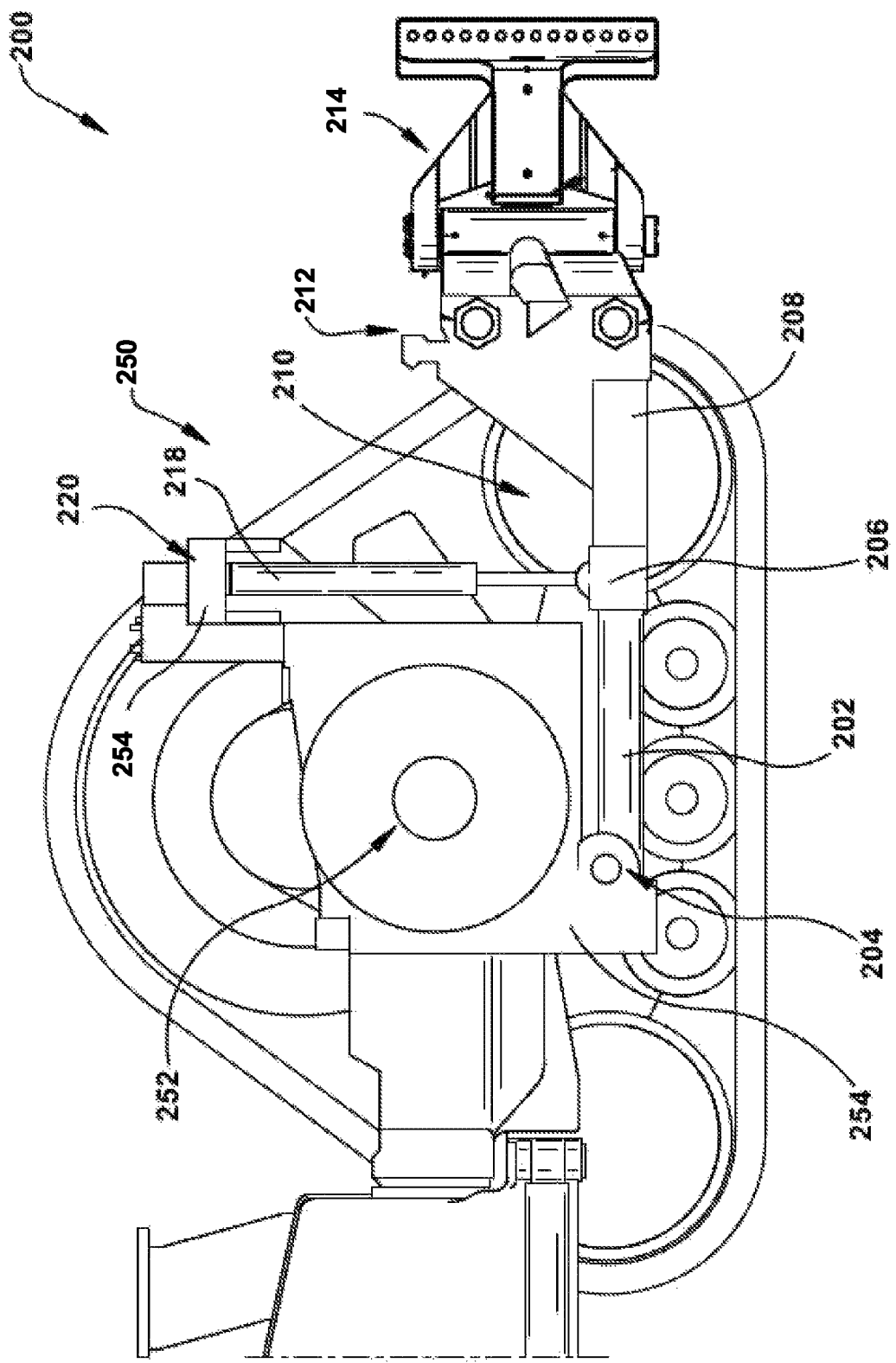
FIG. 2 is a component diagram illustrating an example implementation of one or more portions of a system for varying vertical downward force load.

FIG. 2 is a component diagram illustrating one implementation of one or more portions of an exemplary hitch assembly 200 for coupling an implement to a vehicle, to adjust a vertical load on the rear portion of the vehicle (e.g., 102 of FIG. 1) coupled with the ground working implement (e.g., 104 or FIG. 1). In this implementation, a track system 250 is installed on the rear axle 252 of the vehicle. It should be noted that the exemplary system 200 may also be utilized when a wheel is installed on the vehicle in place of the track system 150.

The exemplary hitch assembly 200 can comprise a vertical load member 210 comprising a first portion 202 at a front end and a second portion 208 at a rear end of the vertical load member 210. The vertical load member 210 can comprise a frame connection coupler 204 at the first portion 202, which is used to couple the member 210 to a portion of the vehicle rear frame 254. The frame connection coupler 204 at the first portion 202 provides a pivotable coupling with the vehicle rear frame 254 in a pitch axis. As an example, the frame connection coupler 204 can be coupled to the vehicle rear frame 254 using a pin, a fastener, or other mechanical linkage that provides for pivoting in the pitch axis. Further, the frame connection coupler 204 is configured to be operably, pivotably coupled with a frame of a vehicle 254 at a point that is forward of the rear axle 252 of the vehicle.

In this implementation, the exemplary assembly 200 can comprise an implement attachment assembly 212 disposed at the rear end of the second portion 208, of the vertical load member 210. The implement attachment assembly 212 can operably couple with an implement attachment hitch that couple to the implement towed by the vehicle. For example, the implement attachment assembly 212 can be formed with or fixed to the rear end of the vertical load member 210, so that the vertical load member 210 can be selectively coupled with a hitch 214 that couples to the implement, or selectively couples directly with the implement. In this example, either way, there is typically some sort of hitch disposed between the vertical load member 210 and the implement that allows the two to operably couple, so that the vehicle can tow the implement.

As illustrated in FIG. 2, the exemplary hitch assembly 200 comprises a rear actuator 218 that comprises a first end 206 and second end 220. The first end 206 can comprise a coupling/pivot point that is pivotably coupled with the vertical load member 210 between the front end of the first portion 202 and the rear end of the second portion 208. The rear actuator 218 is coupled with the vertical load member 210 in a pitch axis. Further, the second end 220 of the actuator 218 can comprise a coupling/pivot point that is operably, pivotably coupled to a rear axle frame portion 254 of the vehicle frame, at a point rearward of the rear axle 252 of the vehicle. The actuator 218 is operable to move the vertical load member 210 (e.g., up and down), resulting in the vertical load member 210 pivoting about the coupling 204 to the vehicle frame at the first portion 202 of the vertical load member 210. In this way, the implement attachment assembly 211 can be selectively raised and lowered at the rear end of the second portion 208 of the vertical load member 210. In one or more implementations, the rear actuator 218 can comprise one of: a hydraulic cylinder, a pneumatic cylinder, and an electrically operated actuator. That is, for example, a hydraulic cylinder can be remotely controlled to expand and retract the cylinder using a hydraulic pump; a hydraulic cylinder can be remotely controlled to expand and retract the cylinder using an air compressor or compressed air; and an electrically controlled actuator can be remotely operated to raise or lower the vertical load member 210 using electrical power.

Figure 3:
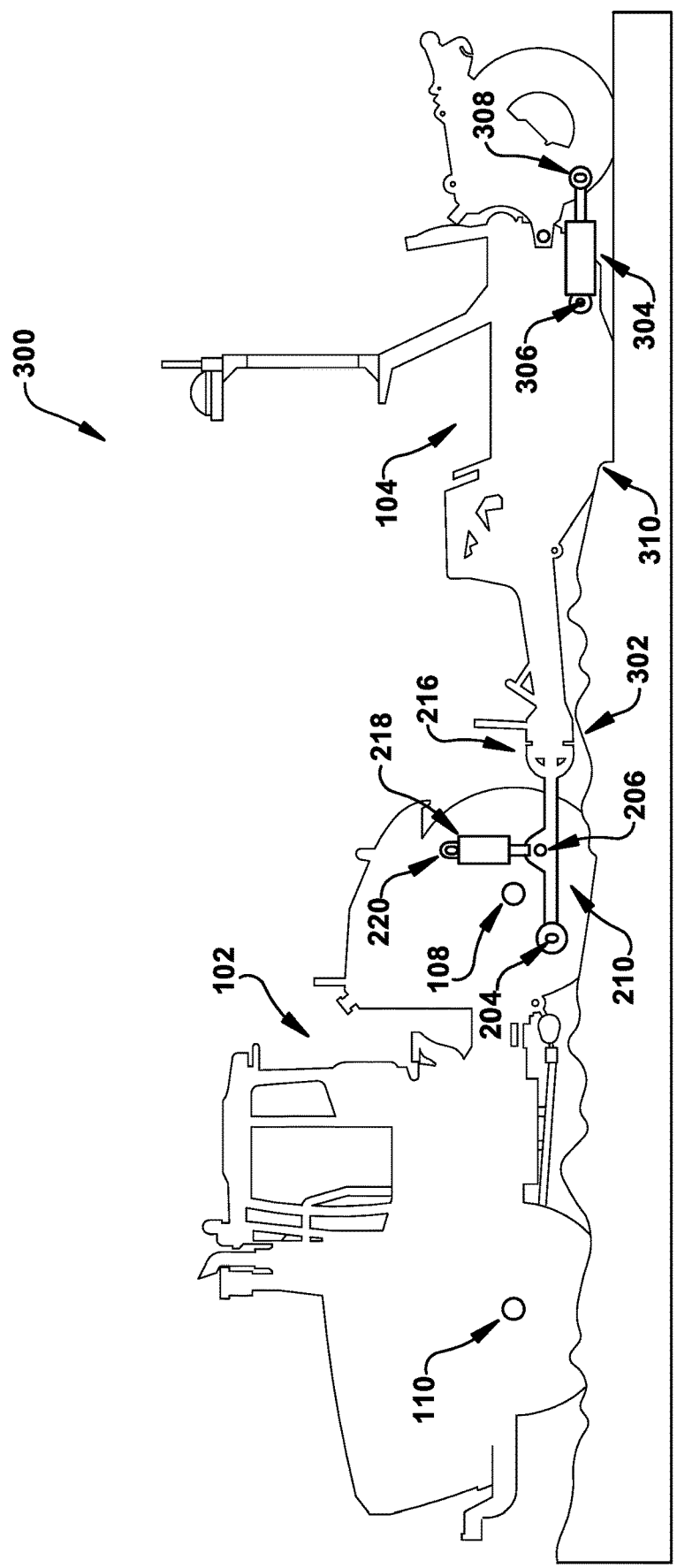
FIG. 3 is a component diagram illustrating an example implementation of a system for improving operation of a vehicle towing an implement.

FIG. 3 is a component diagram illustrating an example environment 300 where one or more portions of one or more systems and techniques described herein may be implement. With continued reference to FIGS. 1 and 2, the example hitch assembly 200 can be disposed proximate the rear axle 108, 252 of the example vehicle 102 (e.g., coupled with a track system 250, or a wheel system), coupling with the rear frame 254 of the vehicle 102. In this example, the implement coupling hitch 216 can be engaged with an implement coupler 302 disposed on a tongue or drawbar of the implement 104. Further, the rear actuator 218 is engaged with the rear frame 254 at the top end coupling point 220, and engaged with the vertical load member 210 at the bottom end coupling point 208. The vertical load member 202 is pivotably coupled with the rear vehicle frame 254 at the front coupling point 204, providing a pitch axis pivot for the vertical load member 210.

In this example, the rear actuator 218 can raise the vertical load member 210, resulting in the vertical load member 210 pivoting about the coupling point 204, thereby lifting the front end of the implement 104 at the implement coupler 302. Further, the rear actuator 218 can lower the vertical load member 210, resulting in the vertical load member pivoting about the coupling point 204, thereby lowering the front end of the implement 104 at the implement coupler 302. Additionally, because the vertical load member 210 is coupled with the vehicle's frame (at 204) at a point forward of the rear axle 108, 252, the raising and lowering of the vertical load member 210 results in an adjustment of the amount of vertical force applied by the implement 104 to the coupling point 204 in front of the rear axle 108, 252.

As illustrated in FIG. 3, the attached implement 104 can comprise an implement actuator 304. The implement actuator 304 is coupled to a first portion of the implement 104 at a coupling point 306, and to second portion of the implement 104 at a second coupling point. As an illustrative example, the implement 104 can comprise a scraper with a ground-working portion 310 that contacts the ground to scrape soil from the surface. In other implementations, the implement may comprise other types of ground working tools, such as a planter, seeder, tillage implement, a grader, and other implements that comprise a ground-working portion that contacts the ground. Further, in this implementation 300, the actuator 304 can extend to lower the ground-working portion 310 with respect to the ground; and the actuator 304 can contract to raise the ground-working portion 310 with respect to the ground (e.g., as illustrated in FIG. 1).

Figure 4:
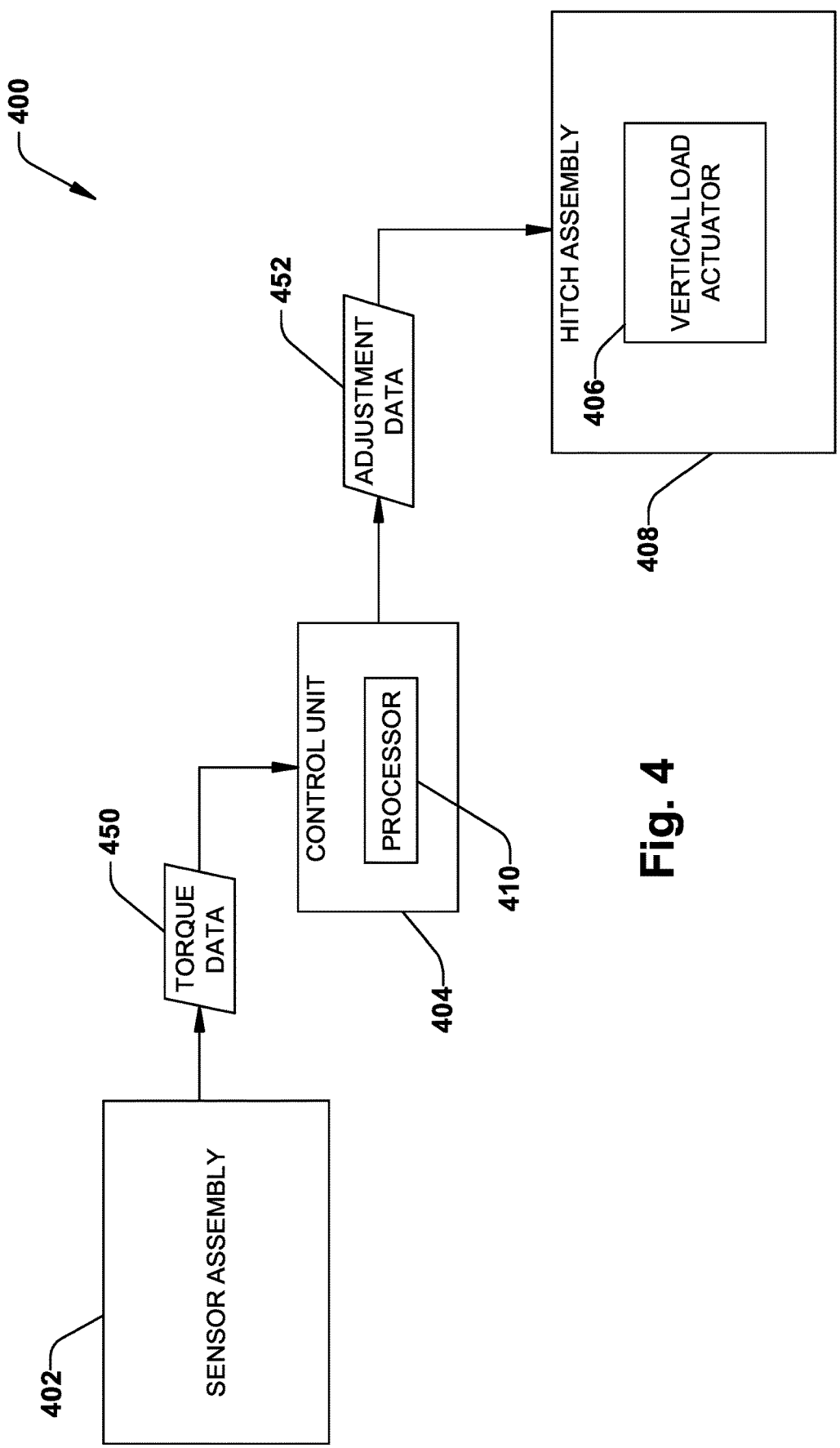
FIG. 4 is a schematic diagram illustrating one example implementation of a portion of a system described herein.

FIG. 4 is a schematic diagram illustrating implementation of an exemplary system 400 for improving operation of a vehicle that is towing an implement. With continued reference to FIGS. 1 and 2, the exemplary system 400 comprises a hitch assembly 408 comprising a vertical load member 210, and an vertical load actuator 406, the vertical load member 210 comprising a front end 202 and a rear end 208, the front end 202 pivotably coupled with a frame 254 of a vehicle 102 at a point forward of an axis of rotation of a rear axle 252 of the vehicle 102, the rear end 208 operably coupled with an implement hitch 214 engaged with an implement 104, the vertical load actuator 406 coupled with the vehicle frame 254 and with the vertical load member 210 between the front end 202 and the rear end 208 to operably raise and lower the rear end 208 of the vehicle load member 210.

Further, the exemplary system 400 comprises a sensor assembly 402 identifying torque at a front axle 110 and at the rear axle 108 of the vehicle 102 operably towing the implement 104. Additionally, a control unit 404 comprises a processor 410, and is communicatively coupled with the sensor assembly 402 to receive data 450 indicative of the torque at the front axle and at the rear axle from the sensor assembly 402. The control unit 404 generating vertical load adjustment data 452 to adjust the vertical load actuator 406 based at least upon the data 450 received from the sensor array 402.

As an example, the sensor assembly 402 can comprise one or more torque sensors that detect the torque at the front axle and detect the torque at the rear axle. For example, typical tractors towing a ground scraper may have about eighty-percent of the power at the rear axle, and twenty-percent power at the front axle. Often, these types of vehicles have the same power ratings and gearing at both the front and rear axles, and operators may add weight to the front to attempt to even out the power sharing. In this example, when the torque sensors detect the torque differential between the front and back an adjustment to the vertical load member to adjust the amount of load between the front and rear axles.

Figure 5:
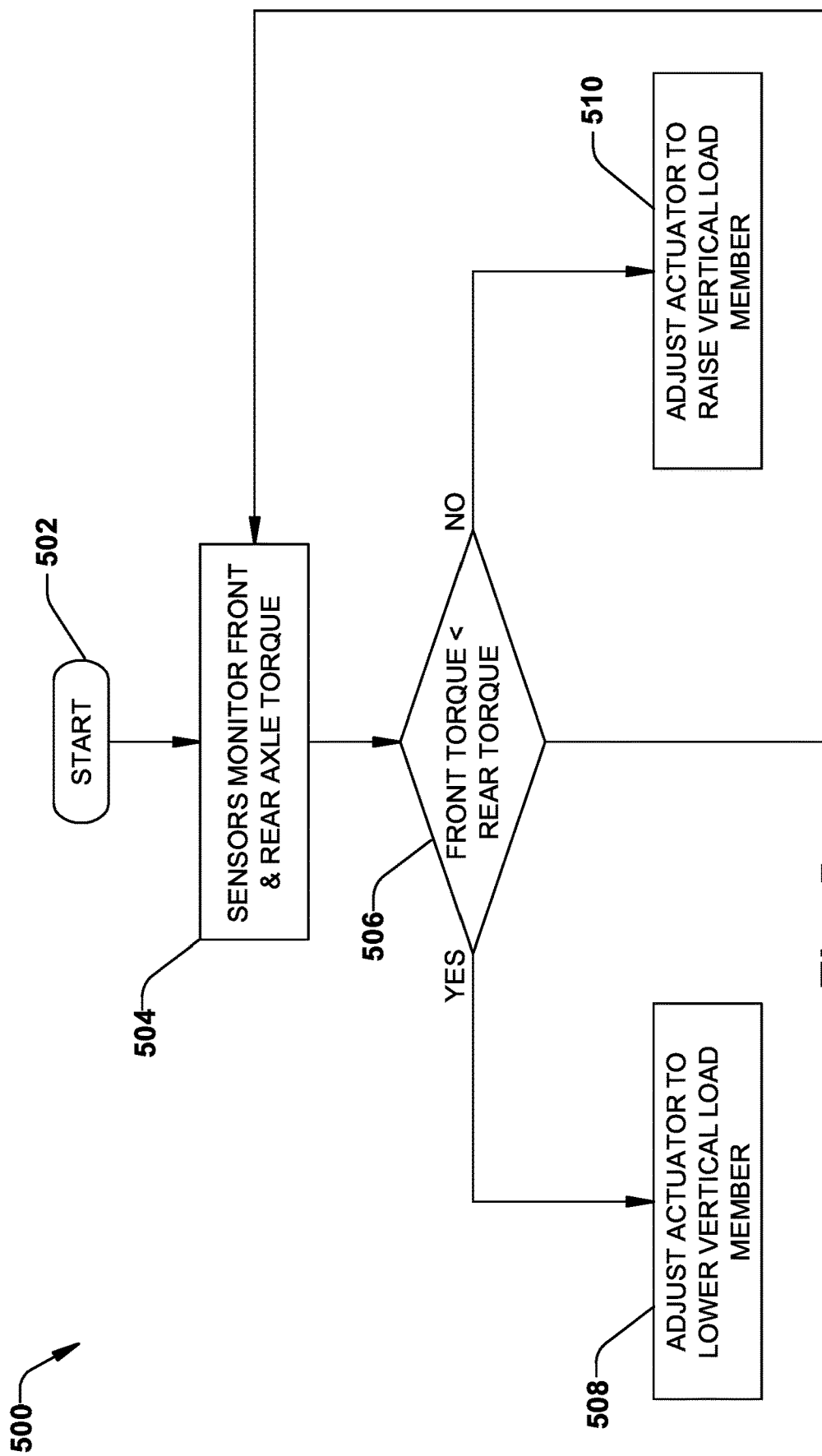
FIG. 5 is a flow diagram illustrating one implementation of one or more portions of one or more techniques described herein.

FIG. 5 is a flow diagram that illustrates an example method 500 for adjusting the vertical load distribution between the front axle and the rear axle of a vehicle, which may be applied by a system, such as the example, system 400. In this implementation, the example method begins at 502, such as when the vehicle begins towing and operating the implement. At 504 the sensor assembly monitors the front and rear axle torque. For example, the amount of torque generated at the respective axles can be indicative of how much power is being used at each axle. Even though both the front and rear axles can perform substantially the same, for example, when towing a ground working implement, such as a scraper, the rear axles tend to use most of the power. In this example, the power distribution may can be due to the amount of vertical load applied by the implement to the vehicle's frame, for example.

Figure 6:
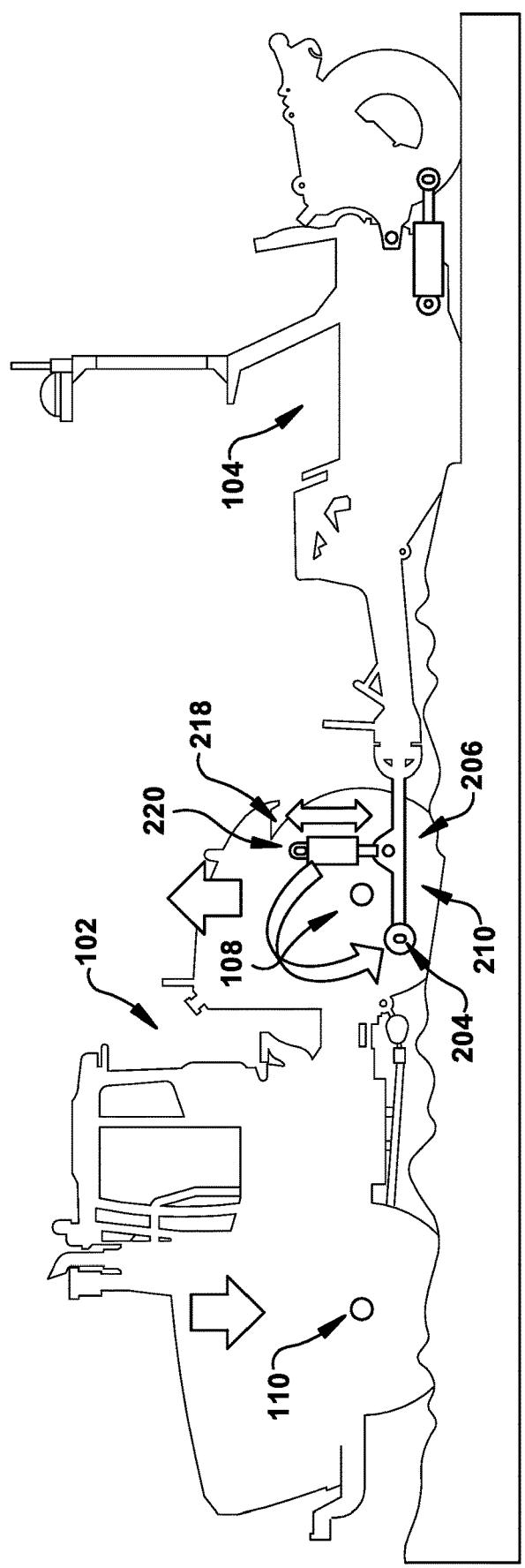
FIG. 6 is a component diagram illustrating one implementation of one or more portions of one or more systems described herein.

At 506, in method 500, the control unit can receive data indicative of torque from the front axle and rear axle and determine that the torque at the front axle is less than the torque at the rear axle (yes at 506). The control unit can generate vertical load adjustment data that results in the vertical load actuator lowering the vertical load member, at 508. As an example, as illustrated in FIG. 6, the vertical load adjustment data generated by the control unit can be used to actuate the vertical load member actuator 218, such as extending a hydraulic cylinder. Because the vertical load member actuator 218 is coupled with the vehicle frame at coupling point 220 and to the vertical load member at 206, extending the vertical load member actuator 218 pushes down on the vertical load member 210, lifting up on the vehicle frame at the rear axle 108, and pushing down the front axle 110. This can help transfers some of the vertical load from the rear axle 108 to the front axle 110. In this way, the rear axle may use less torque to perform the same function, and the front axle may use more torque, thereby balancing power use between the two axles.

Figure 7:
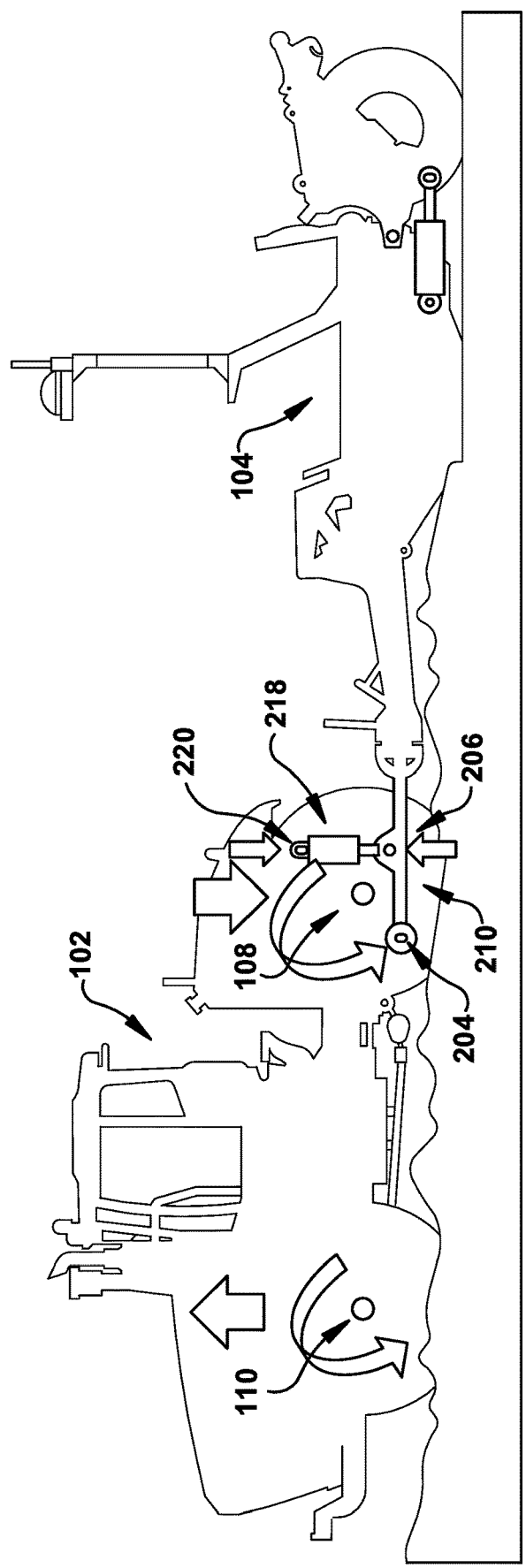
FIG. 7 is a component diagram illustrating one implementation of one or more portions of one or more systems described herein.

Alternately, at 506, the control unit can determine that the torque at the front axle is greater than the torque at the rear axle. The control unit can generate vertical load adjustment data that results in the vertical load actuator raising the vertical load member, at 510. As an example, as illustrated in FIG. 7, the vertical load adjustment data generated by the control unit can be used to actuate the vertical load member actuator 218, such as contracting the hydraulic cylinder. Because the vertical load member actuator 218 is coupled with the vehicle frame at coupling point 220 and to the vertical load member at 206, contracting the vertical load member actuator 218 can lift up the vertical load member 210, pushing down up the vehicle frame at the rear axle 108, and lifting up the front axle 110. This can help transfers some of the vertical load from the front axle 110 to the rear axle 108. In this way, the front axle may use less torque to perform the same function, and the rear axle may use more torque, thereby balancing power use between the two axles.

In the example method 500, the sensor assembly can continue to monitor the front and rear axle torque.

Figure 8:
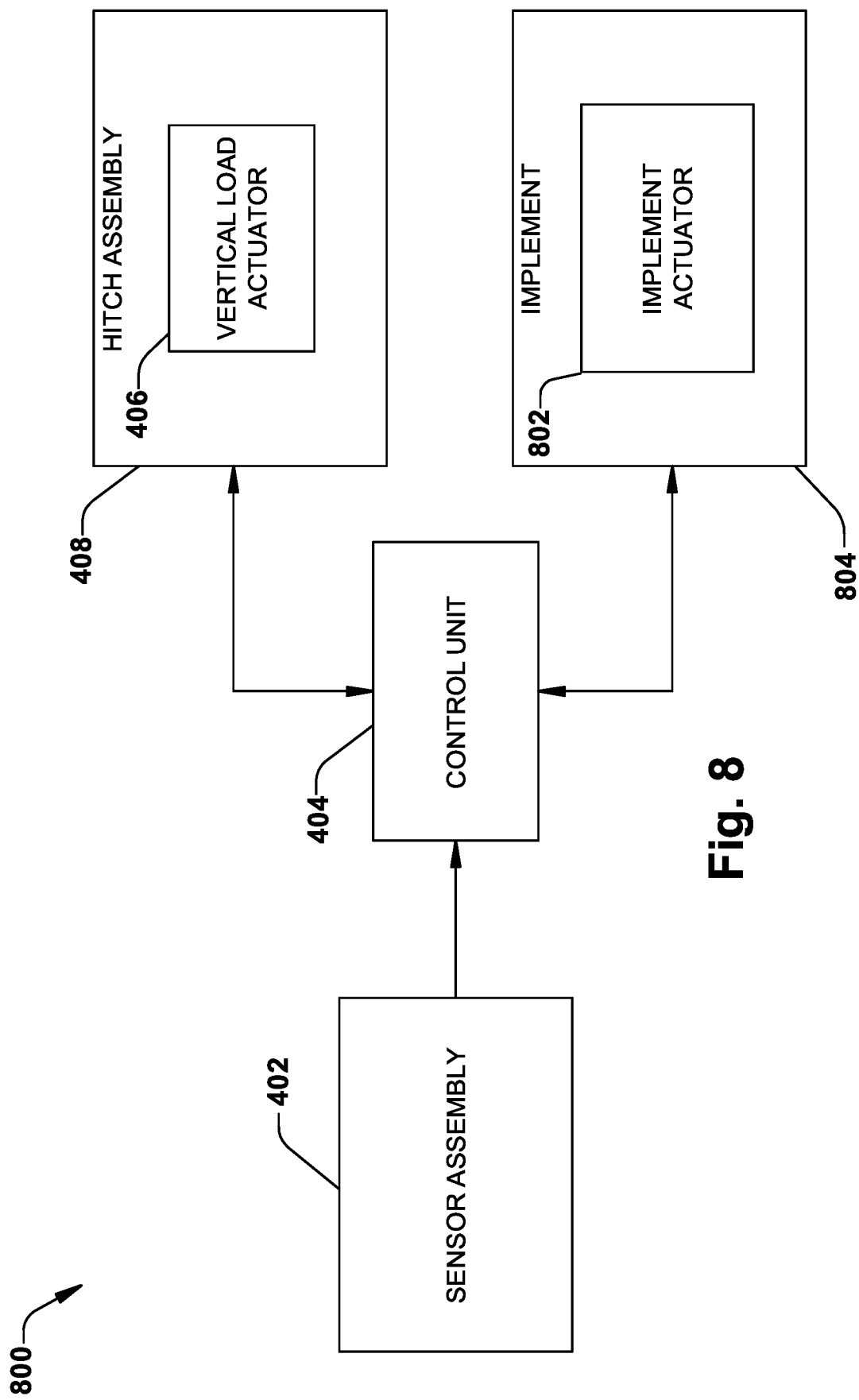
FIG. 8 is a schematic diagram illustrating one example implementation of a portion of a system described herein.

In other implementations, as illustrated in FIG. 8, with continued reference to FIG. 3, an example system 800 can comprise the implement 804 (e.g., 104 in FIG. 3), and an implement actuator 802 (e.g., 304 in FIG. 3). In this implementation, the implement actuator 802 is disposed on the implement 802 to adjust contact with the ground for a ground-working portion (e.g., 310 of FIG. 3) of the implement 804. The implement actuator 304 can be adjusted based at least upon data, such as torque data, from the sensor assembly 402 received by the control unit 404. In this implementation, the implement actuator 802 is communicatively coupled with the control unit 404 to receive implement actuator adjustment data from the control unit 404 resulting in adjustment of the implement actuator 802, and to provide actuator position data to the control unit 404. Further, in some implementations, the vertical load actuator 406 can provide vertical load actuator position data to the control unit 404. In this way, the control unit 404 can identify the position of the implement actuator 802 and/or the vertical load actuator 406 with respect to the amount of load being applied to the implement and/or the vertical load member.

Figure 9:
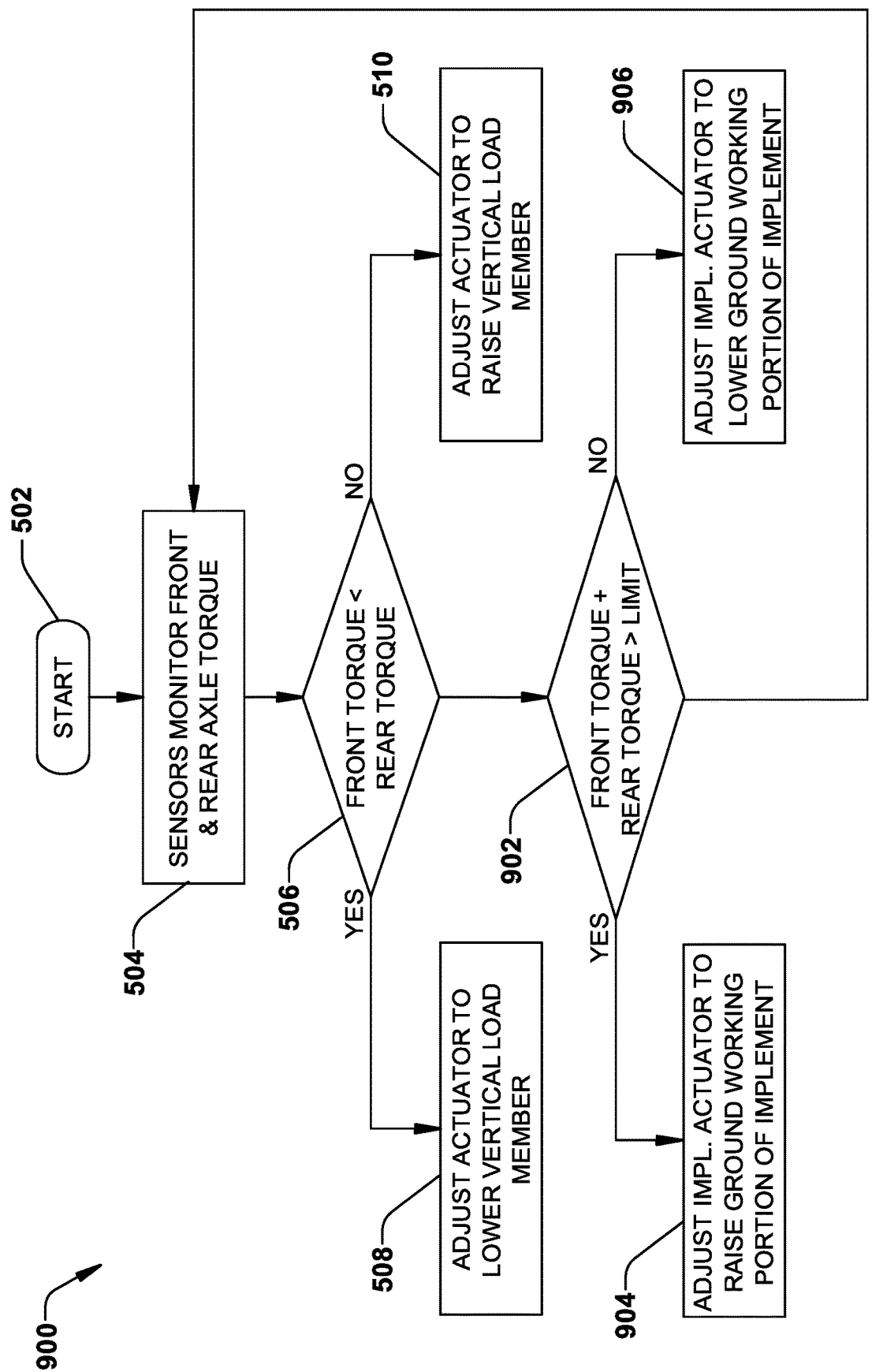
FIG. 9 is a flow diagram illustrating one implementation of one or more portions of one or more techniques described herein.

As an example, in one implementation of a method 900 in FIG. 9, with continued reference to FIGS. 5 and 8, at 902, the control unit 404 can determine that a combination of the front axle torque and the rear axle torque is greater than a torque threshold limit. For example, the vehicle towing the implement may have a specification that identifies a limit for the amount of torque output at the axles. In this example, this specified limit can be used by the control unit 404 as a threshold limit for the combined rear and front axle torque. In this implementation 900, at 904, the control unit 404 can generate implement actuator adjustment data that results in the implement actuator 802 raising the ground-working portion of the implement with respect to the ground.

Figure 10:
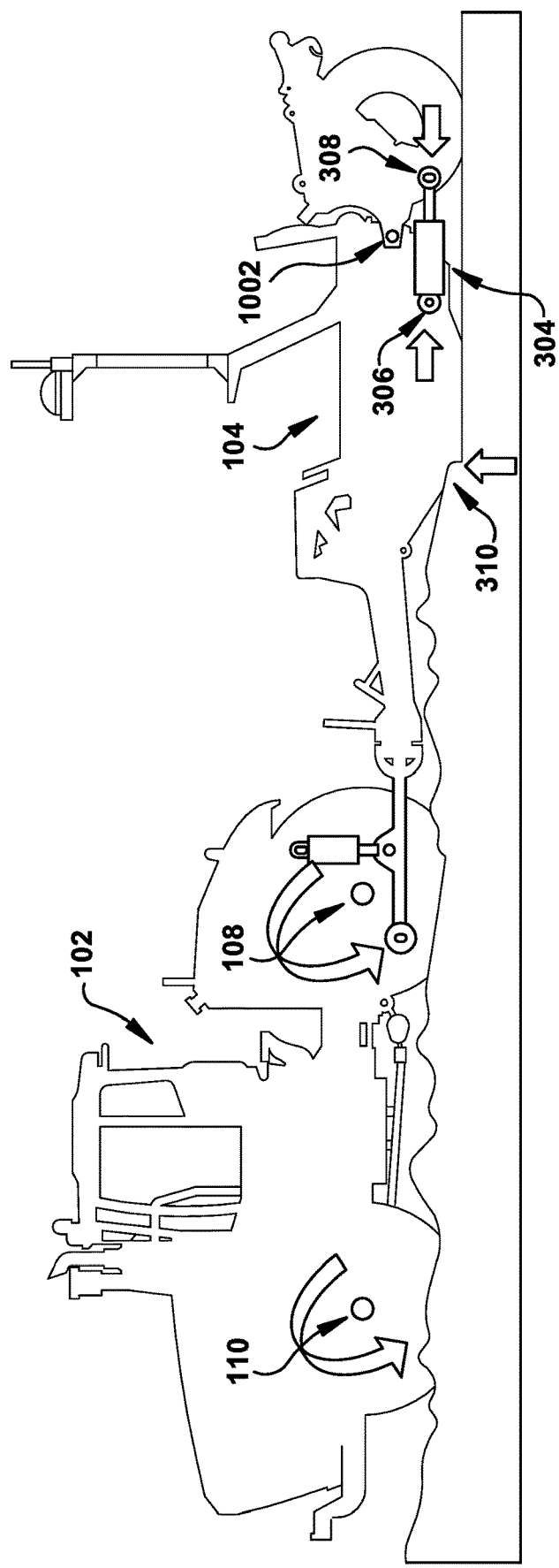
FIG. 10 is a component diagram illustrating one implementation of one or more portions of one or more systems described herein.

As an illustrative example, FIG. 10 shows the example vehicle 102 towing the implement 104, with continued reference to FIG. 9. As illustrated, the implement 104 is articulated at 1002, and comprises an implement actuator 304 coupled with the implement at 306 and 308, on either side of the articulation point 1002. In this example, the generated implement actuator adjustment data from the control unit 404 can compress the implement actuator 304, which draws the coupling points 306, 308 together. In this example, this action raises the ground-working contact portion 310 of the implement 104. In this way, in this example, the scraper's contact with the ground is lessened, thereby reducing an amount of torque needed to tow the implement 104, such as below the threshold limit.

Figure 11:
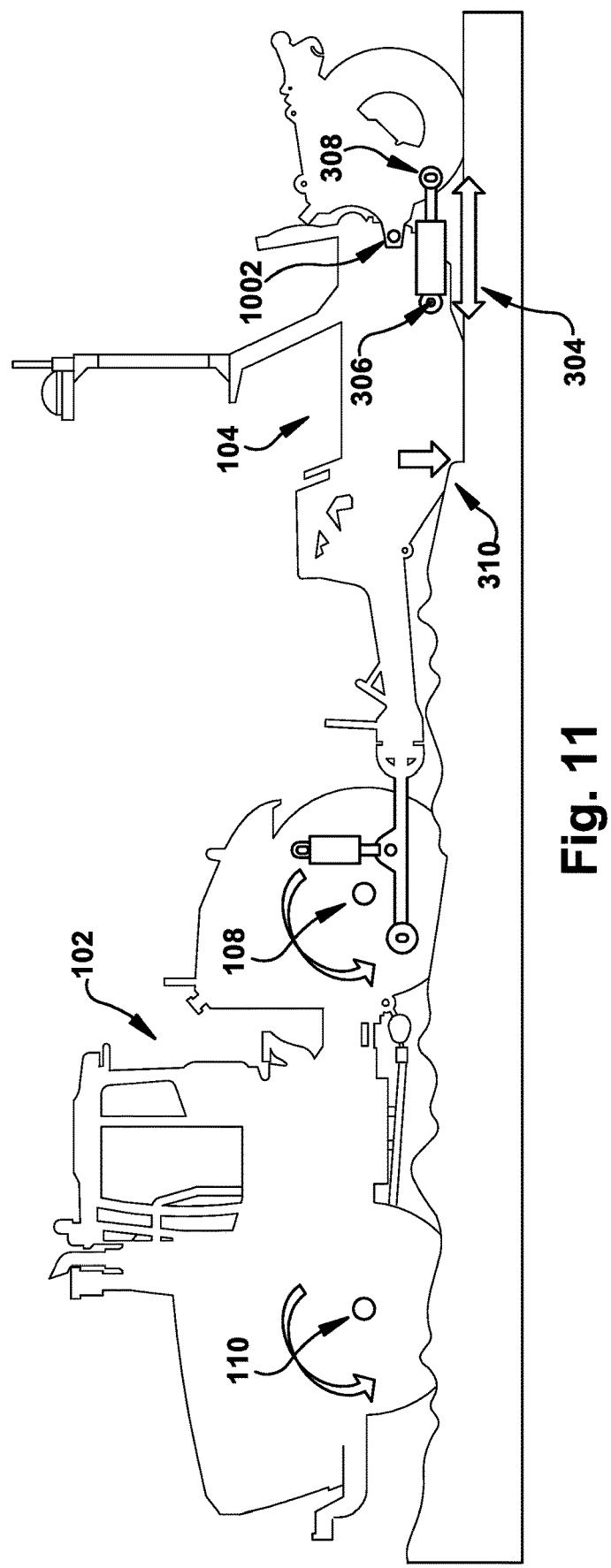
FIG. 11 is a component diagram illustrating one implementation of one or more portions of one or more systems described herein.

Returning to the example method 900 in FIG. 9, the control unit 404 may determine that a combination of the front axle torque and the rear axle torque is less than a torque threshold, at 902. At 906 the control unit can generate implement actuator adjustment data that results in the implement actuator 802 lowering the ground-working portion of the implement with respect to the ground. As an illustrative example, in FIG. 11, the generated implement actuator adjustment data from the control unit 404 can extend the actuator 304. This results in the coupling points 306, 308 moving apart, resulting in the ground-working portion 310 lowering with respect to the ground. In this way, for example, more of the ground-working portion 310 is in contact with the ground, resulting in more torque needed to tow the implement 104. Because the combined torque is lower than the threshold limit for the vehicle, for example, the ground-working portion 310 can contact further into the ground.

Figure 12:
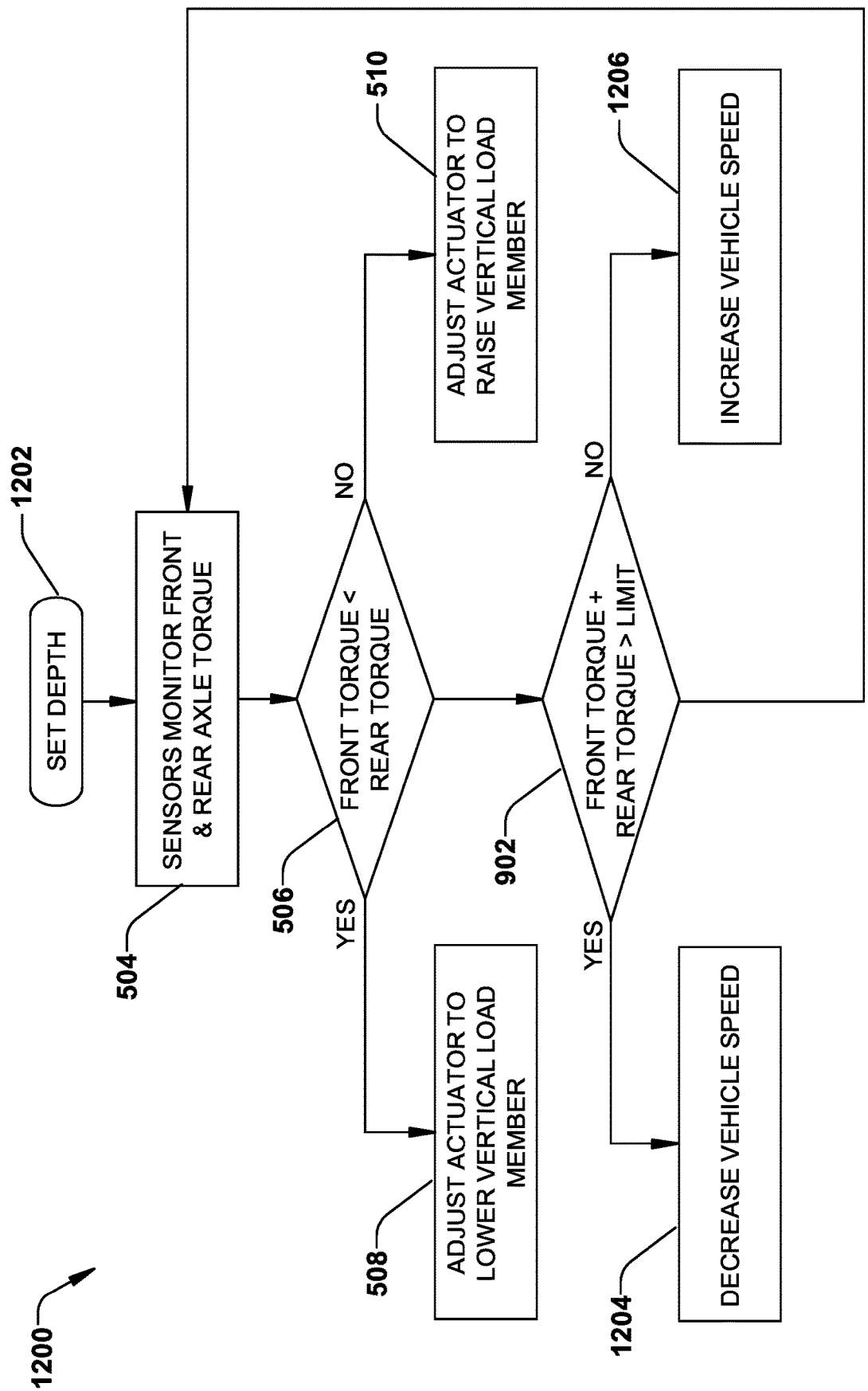
FIG. 12 is a flow diagram illustrating one implementation of one or more portions of one or more techniques described herein.

FIG. 12 is a flow diagram illustrating an alternate example method 1200 for adjusting vehicle operation based on sensor data, in combination with FIGS. 5 and 9. At 1202, the operator may set a desired depth of the ground-portion (e.g., 310 of FIG. 3) of the vehicle (e.g., 104). That is, for example, the operator may want a certain amount of top soil removed from the ground, or a seed to be planted at a particular depth in the ground. In this example, the desired depth can be set. At 506, 508, and 510, the vertical load member actuator can be set, as described above. At 902, as described above, the combination of the front and rear torque can be identified.

Because the depth is preset, for example, the ground-working portion of the implement may not be adjusted, as described in FIG. 9. Instead, the control unit can determine that the combination of the front axle torque and the rear axle torque is greater than a torque threshold, and generate vehicle speed adjustment data indicative of a reduction in vehicle speed, at 1204. That is, for example, the vehicle speed adjustment data may result in an automatic reduction of the vehicle speed to a speed that reduces combined torque below the threshold limit. As another example, the vehicle speed adjustment data may result in a notification provided to the operator of the vehicle to reduce the vehicle's speed below the threshold limit of the combined torque. In this way, the slower speed may reduce the amount of torque needed to perform the same working depth for the ground-working portion.

Alternately, the control unit can determine that the combination of the front axle torque and the rear axle torque is less than the torque threshold, and can generate vehicle speed adjustment data indicative of an increase in vehicle speed. In this implementation, for example, the vehicle speed adjustment data may result in an automatic increase of the vehicle speed to a speed that increase combined torque that is still below the threshold limit. As another example, the vehicle speed adjustment data may result in a notification provided to the operator of the vehicle that they can increase the vehicle's speed and still remain below the threshold limit of the combined torque. In this way, the ground-working portion's depth can be maintained, and the vehicle speed can be increase.

Figure 13:
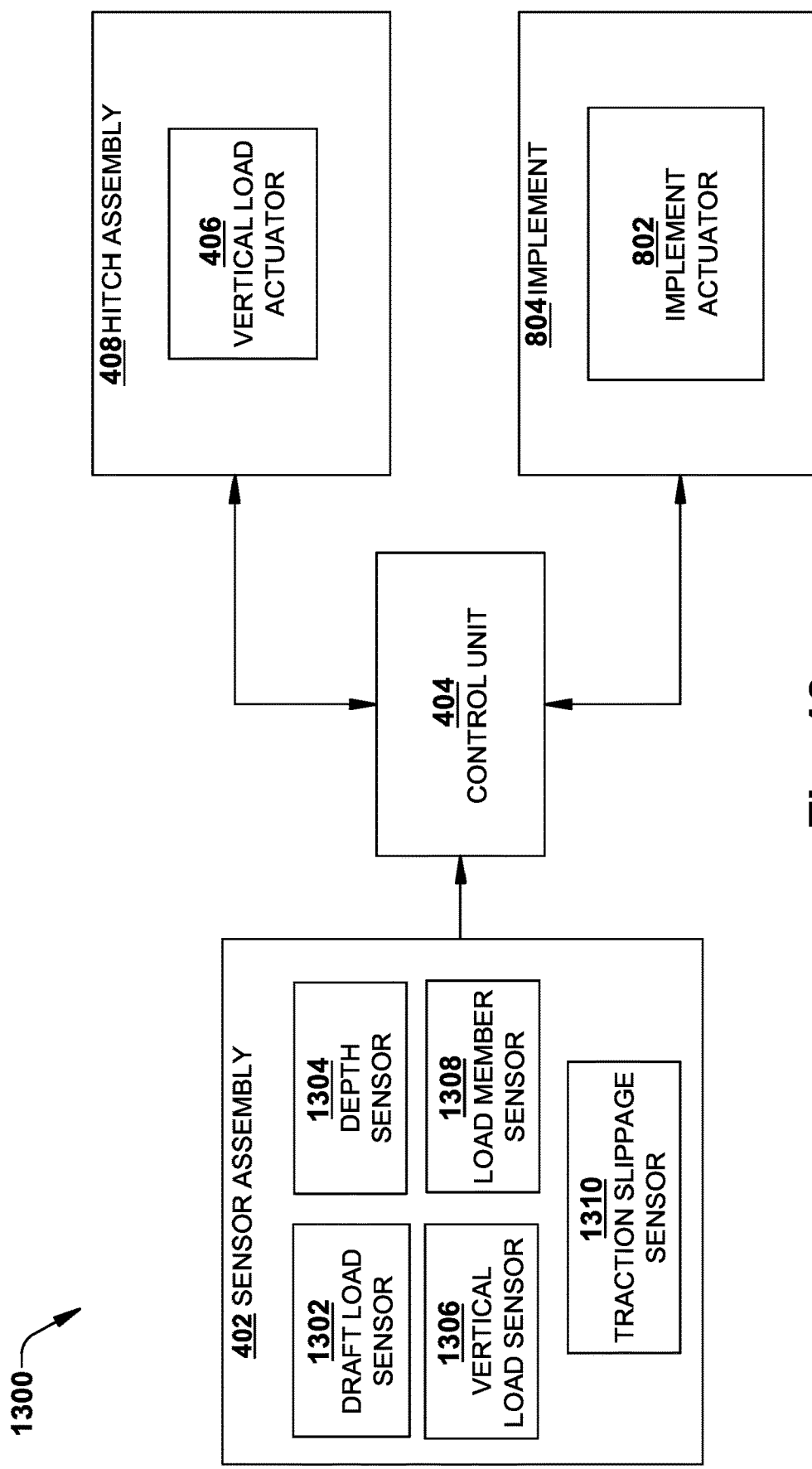
FIG. 13 is a schematic diagram illustrating one example implementation of a portion of a system described herein.

FIG. 13 is a schematic diagram illustrating one example implementation of a system 1300 for improving operation of a vehicle towing an implement, with continued reference to FIGS. 4 and 8. In this implementation, the sensor assembly 402 can identify a draft load applied by the implement 804 to the vehicle (e.g., 102), using one or more draft load sensors 1302. For example, a draft load is an amount of pulling load (e.g., force, weight, etc.) that is applied to the vehicle by the implement under operation. In this implementation, the control unit 404 can receive data indicative of the draft load applied by the implement to the vehicle from the sensor assembly 402. Further, the sensor assembly 402 can identify a vertical load applied by the implement 804 to the vehicle's vertical load member in the hitch assembly 408, using one or more vertical load sensors 1306. For example, a vertical load is an amount of downward load (e.g., force, weight, etc.) that is applied to the vehicle load member and/or the rear frame of the vehicle by the implement under operation. In this implementation, the control unit 404 can receive data indicative of the vertical load applied by the implement to the vehicle's vertical load member from the sensor assembly 402.

Additionally, the sensor assembly 402 can identify a depth of cut applied by the implement 804 to the ground, using one or more depth sensors 1304. For example, a ground-working portion (e.g., 310 of FIG. 3) of the implement under operation can impact the ground at a particular depth (e.g., preset or modified based on in-situ conditions). In this implementation, the control unit 404 can receive data indicative of the depth of cut of the implement to the ground from the sensor assembly 402. The sensor assembly 402 can also identify a position of the vertical load actuator 406, using one or more position sensors 1308. For example, as described above, the position of the vertical load actuator 406 may be adjusted to vary an amount of load applied to the rear axle of the vehicle. In this implementation, the control unit 404 can receive data indicative of the vertical load actuator 406 from the sensor assembly 402.

In some implementations, the sensor assembly 402 can further identifying traction slippage of tires or tracks at respective axles with respect to the ground, such as using one or more traction slippage sensors 1310. For example, a vehicle may have wheels disposed at respective axles, as illustrated in FIG. 1. In this implementation, for example, during operation towing an implementation the wheels may lose traction and slip. As an example, an operational range of tire slippage may eight to twelve percent of rotation. If slippage occurs above this range, the vehicle may not be operating effectively, and tire wear can be increased. As another example, the vehicle may have tracks installed at one or more axles, as illustrated in FIG. 2. As an example, an operational track slippage may about four percent of rotation. If slippage occurs above this amount, the vehicle may not be operating effectively, and track wear can be increased.

In one implementation, the control unit 404 can receive data from the sensor assembly 402 that is indicative of traction slippage of tires or tracks at respective axles with respect to the ground. In this implementation, the control unit 404 can determine that the traction slippage at one of the axles is outside a predetermined traction slippage threshold, such as one that is preset. Further, the control unit 404 can generate vertical load adjustment data that results in the vertical load actuator 406 adjusting the vertical load member to adjust the traction slippage at the one axle. That is, for example, the slippage data provided by the traction slippage sensors 1310 may indicate that the vertical load can be balanced more efficiently between the front and rear axles. For example, if the rear axle is slipping outside of the preset limit, vertical load can be shifted to the front axles, such as by lowering the vertical load member, as described above. Alternately, if the front axle is slipping outside of the preset limit, vertical load can be shifted to the rear axles, such as by raising the vertical load member, as described above. As an example, the rear wheels may slip if excessive vertical load is applied at the rear axle. In this example, at least a portion of the vertical load may be shifted to front axles. As another example, the front wheels may slip if the vertical load on the front axle is less than that which provides for traction. In this example, at least a portion of the vertical load can be shifted to the front axle.

The word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, At least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

The implementations have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

What is claimed is:

1. A system for improving operation of a vehicle towing an implement, comprising:
    a hitch assembly comprising a vertical load member, and an vertical load actuator, the vertical load member comprising a front end and a rear end, the front end pivotably coupled with a frame of a vehicle at a point forward of an axis of rotation of a rear axle of the vehicle, the rear end operably coupled with an implement hitch that is operable to engage with an implement, the vertical load actuator coupled with the vehicle frame and with the vertical load member between the front end and the rear end to operably raise and lower the rear end of the vehicle load member;
    a sensor assembly identifying torque at a front axle and at the rear axle of the vehicle when the vehicle is operably towing an implement; and
    a control unit comprising a processor, and communicatively coupled with the sensor assembly to receive data indicative of the torque at the front axle and at the rear axle from the sensor assembly, the control unit generating vertical load adjustment data to adjust the vertical load actuator based at least upon the data received from the sensor assembly.

2. The system of claim 1, the sensor assembly further identifying one or more of:
    a draft load applied by the implement to the vehicle;
    a depth of cut applied by the implement to the ground;
    a vertical load applied to the vertical load member; and
    a position of the vertical load member.

3. The system of claim 1, the control unit further receiving data from the sensor assembly indicative of one or more of:
    a draft load applied by the implement to the vehicle;
    a depth of cut applied by the implement to the ground;
    a vertical load applied to the vertical load member; and
    a position of the vertical load member.

4. The system of claim 1, the sensor assembly further identifying traction slippage of tires or tracks at respective axles with respect to the ground.

5. The system of claim 4, the control unit further receiving data from the sensor assembly indicative of traction slippage of tires or tracks at respective axles with respect to the ground.

6. The system of claim 5, the control unit determining that the traction slippage at one of the axles is outside a predetermined traction slippage threshold and generating vertical load adjustment data that results in the vertical load actuator adjusting the vertical load member to adjust the traction slippage at the one axle.

7. The system of claim 1, comprising an implement actuator disposed on the implement to adjust contact with the ground for a ground-working portion of the implement, the implement actuator adjusted based at least upon data from the sensor assembly received by the control unit.

8. The system of claim 7, the implement actuator communicatively coupled with the control unit to receive implement actuator adjustment data from the control unit resulting in adjustment of the implement actuator, and to provide actuator position data to the control unit.

9. The system of claim 7, the control unit:
determining that a combination of the front axle torque and the rear axle torque is greater than a torque threshold and generating implement actuator adjustment data that results in the implement actuator raising the ground-working portion of the implement with respect to the ground; and
determining that a combination of the front axle torque and the rear axle torque is less than a torque threshold and generating implement actuator adjustment data that results in the implement actuator lowering the ground-working portion of the implement with respect to the ground.

10. The system of claim 1, the control unit:
determining that the torque at the front axle is less than the torque at the rear axle and generating vertical load adjustment data that results in the vertical load actuator lowering the vertical load member; and
determining that the torque at the front axle is greater than the torque at the rear axle and generating vertical load adjustment data that results in the vertical load actuator raising the vertical load member.

11. The system of claim 1, the control unit receiving data indicative of a desired ground depth of a ground-working portion of the implement, and the control unit:
determining that a combination of the front axle torque and the rear axle torque is greater than a torque threshold and generating vehicle speed adjustment data indicative of a reduction in vehicle speed; and
determining that a combination of the front axle torque and the rear axle torque is less than a torque threshold and generating vehicle speed adjustment data indicative of an increase in vehicle speed.

12. The hitch assembly of claim 1, the vertical load actuator comprising one of: a hydraulic cylinder, a pneumatic cylinder, and an electrically operated actuator.

13. A method for improving operation of a vehicle towing an implement, wherein the vehicle comprises a hitch assembly that comprises a vertical load member and an vertical load actuator, wherein the vertical load member comprise a front end and a rear end, wherein the front end is pivotably coupled with a frame of the vehicle at a point forward of a rear axle of the vehicle, and wherein the rear end is coupled with an implement hitch that is operable to engage with an implement, wherein the vertical load actuator is coupled with the vehicle frame and the vertical load member between the front end and the rear end; and a sensor assembly that identifies torque at a front axle and at the rear axle of the vehicle, the method comprising:
receiving, at a control unit, data indicative of the torque at the front axle and at the rear axle from the sensor assembly, the control unit comprising a processor and communicatively coupled with the sensor assembly; and
generating, by the control unit, vertical load adjustment data to adjust the vertical load actuator based at least upon the data received from the sensor assembly to operably transfer vertical load applied by an operably coupled implement between the rear axle and the front axle.

14. The method of claim 13, comprising receiving sensor data, at the control unit, from the sensor assembly, the sensor data comprising one or more of:
a draft load applied by the implement to the vehicle;
a depth of cut applied by the implement to the ground;
traction slippage of tires or tracks at respective axles with respect to the ground;
a vertical load applied to the vertical load member; and
a position of the vertical load member.

15. The method of claim 14, determining, using the control unit, one or more of the sensor data is outside a predetermined threshold and generating vertical load adjustment data that results in the vertical load actuator adjusting the vertical load member to adjust the vertical load between the front and rear axles.

16. The method of claim 13, wherein the implement comprises an implement actuator that adjusts contact with the ground for a ground-working portion of the implement, and the method further comprising the control unit generating implement actuator adjustment data to adjust the implement actuator based at least upon data from the sensor assembly received by the control unit.

17. The method of claim 16, using the control unit to:
determine that a combination of the front axle torque and the rear axle torque is greater than a torque threshold, and to generate implement actuator adjustment data that results in the implement actuator raising the ground-working portion of the implement with respect to the ground; and
determine that a combination of the front axle torque and the rear axle torque is less than a torque threshold, and to generate implement actuator adjustment data that results in the implement actuator lowering the ground-working portion of the implement with respect to the ground.

18. The method of claim 13, using the control unit to:
determine that the torque at the front axle is less than the torque at the rear axle, and to generate vertical load adjustment data that results in the vertical load actuator lowering the vertical load member; and
determine that the torque at the front axle is greater than the torque at the rear axle, and to generate vertical load adjustment data that results in the vertical load actuator raising the vertical load member.

19. The method of claim 16, receiving, at the control unit, data indicative of a desired ground depth of a ground-working portion of the implement, and using the control unit:
determine that a combination of the front axle torque and the rear axle torque is greater than a torque threshold, and to generate vehicle speed adjustment data indicative of a reduction in vehicle speed; and
determine that a combination of the front axle torque and the rear axle torque is less than a torque threshold, and to generate vehicle speed adjustment data indicative of an increase in vehicle speed.

20. A system for improving operation of a vehicle towing an implement, comprising:
- a hitch assembly comprising a vertical load member, and an vertical load actuator, the vertical load member comprising a front end and a rear end, the front end pivotably coupled with a frame of a vehicle at a point forward of an axis of rotation of a rear axle of the vehicle, the rear end operably coupled with an implement hitch engaged with an implement, the vertical load actuator coupled with the vehicle frame and with the vertical load member between the front end and the rear end to operably raise and lower the rear end of the vehicle load member;
- a sensor assembly comprising one or more sensors identifying torque at a front axle and at the rear axle of the vehicle operably towing the implement, and one or more sensors identifying one or more of:
  - a draft load applied by the implement to the vehicle;
  - a depth of cut applied by the implement to the ground;
  - traction slippage of tires or tracks at respective axles with respect to the ground;
  - a vertical load applied to the vertical load member; and
  - a position of the vertical load member;
- a control unit comprising a processor, and communicatively coupled with the sensor assembly to receive data indicative of the torque at the front axle and at the rear axle from the sensor assembly, the control unit generating vertical load adjustment data to adjust the vertical load actuator based at least upon the data received from the sensor assembly;
- an implement actuator disposed on the implement to adjust contact with the ground for a ground-working portion of the implement, the implement actuator adjusted based at least upon data from the sensor assembly received by the control unit, wherein the implement actuator is communicatively coupled with the control unit to receive implement actuator adjustment data from the control unit resulting in adjustment of the implement actuator, and to provide actuator position data to the control unit.

* * * * *